US005487929A

United States Patent [19]

Rusincovitch, Jr. et al.

[11] Patent Number: 5,487,929

[45] Date of Patent: Jan. 30, 1996

[54] REPOSITIONABLE WALL COVERING

[75] Inventors: George Rusincovitch, Jr., Worthington; Paul J. Roe, Columbus, both of Ohio

[73] Assignee: Borden, Inc., Columbus, Ohio

[21] Appl. No.: 282,792

[22] Filed: Jul. 29, 1994

Related U.S. Application Data

[63] Continuation-in-part of Ser. No. 12,822, Feb. 3, 1993, abandoned.

[51] Int. Cl.$^6$ ........ B32B 9/00

[52] U.S. Cl. ........ 428/40; 428/41; 428/42; 428/161; 428/163; 428/165; 428/167; 428/192; 428/202; 428/211; 428/213; 428/215; 428/317.5; 428/327; 428/332; 428/342; 428/343; 428/352; 428/355; 428/94

[58] Field of Search ........ 428/40, 202, 211, 428/327, 342, 323, 215, 218, 343, 352, 537.5, 92, 94, 97, 82, 85, 41, 42, 161, 163, 165, 167, 192, 213, 317.5, 342, 355

[56] References Cited

U.S. PATENT DOCUMENTS

| | | | |
|---|---|---|---|
| 3,301,741 | 1/1967 | Henrickson et al. . | |
| 3,314,838 | 4/1967 | Erwin | 161/162 |
| 3,331,729 | 7/1967 | Danielson et al. | 156/71 |
| 3,554,835 | 1/1971 | Morgan | 156/234 |
| 3,663,269 | 5/1972 | Fischer et al. | 117/76 A |
| 3,857,731 | 12/1974 | Merrill et al. | 117/122 |
| 4,054,697 | 10/1977 | Reed et al. | 428/40 |
| 4,376,151 | 3/1983 | Parrotta | 428/323 |
| 4,556,595 | 12/1985 | Ochi | 428/143 |
| 4,735,837 | 4/1988 | Miyasaka et al. | 428/40 |
| 5,080,957 | 1/1992 | Leseman et al. | 428/167 |
| 5,108,811 | 4/1992 | Shippen | 428/40 |
| 5,141,790 | 8/1992 | Calhoun et al. | 428/40 |

FOREIGN PATENT DOCUMENTS

| | | |
|---|---|---|
| 0367651 | 5/1990 | European Pat. Off. . |
| 61-115981 | 6/1986 | Japan . |
| 9109725 | 7/1991 | WIPO . |

OTHER PUBLICATIONS

PCT WO 91 09725 Jul. 11, 1991.

*Primary Examiner*—Patrick J. Ryan
*Assistant Examiner*—Abraham Bahta
*Attorney, Agent, or Firm*—Stevens, Davis, Miller & Mosher

[57] ABSTRACT

A sheet material having a decorative surface and a working surface, for application to a support surface is disclosed. A substantial area of the working surface is provided with a tacky, discontinuous layer of pressure sensitive adhesive. A pattern of non-adhesive projections which have a height equal to or greater than the thickness of the adhesive are provided within the discontinuities on the working surface.

25 Claims, 3 Drawing Sheets

REPOSITIONABLE WALL COVERING

This application is a continuation-in-part of our application Ser. No. 08/012,822, now abandoned, which was filed on Feb. 3, 1993.

FIELD OF THE INVENTION

This invention relates to a decorative sheet material for applying to a wall, ceiling, floor, kitchen unit, table or other surface within domestic or industrial premises or place of amenity. In a preferred embodiment, this invention relates to wall coverings, such as wallpaper which utilize a pressure sensitive adhesive and a means to minimize initial adhesion of the wall covering to a wall. Maximum adhesion is subsequently attained after the wall covering has been repositioned as desired.

BACKGROUND OF THE INVENTION

Decorative sheet material such as wall coverings are formed typically of paper, plastic, metal foil, or fabric material having a pattern or design printed or embossed on the front surface, with the other surface, or back, being coated by the consumer with a suitable adhesive, such as glue, cement, or the like (typically known as "wallpaper paste") by which the wall covering may be secured to a wall, ceiling or other surface. Other types of wall coverings include those having a plastic decorative surface and a backing of woven or non-woven fabric or paper. The backing or back surface is adapted to be coated by the user with the aforementioned adhesive in order to secure the wall covering to a surface. However, consumers dislike the inconvenience of mixing and applying the paste. Additionally, prepasted wall coverings need a water pan and this can be messy.

Generally, in conventional wall coverings, once the wall covering is applied to the surface, it may be shifted or adjusted thereon to a limited degree until the adhesive paste cures, or dries.

Pressure sensitive adhesives, hereinafter "PSA" or "PSAs" are known generally for their ability to provide adhesion between two substrates upon contact. PSAs rely on high initial tack and/or quick set-up reaction, or cure time for prompt or instant adhesion. However, PSAs with sufficiently high tack to hold a wall covering in place are very difficult to apply to a wall and then reposition, as occurs for example, while matching up patterns from one wallpaper strip to the next. Although suitable pressure sensitive adhesives have in the past been applied to wall coverings, attempts to reposition those same wall coverings generally have not met with success. Typically, wall coverings having PSA have fallen from the walls to which they were applied shortly after such application due to poor permanent adhesion; the wall covering cannot be slid and repositioned while in contact with the wall due to adhesive tack; the outline of various spacer means used to separate the adhesive from the wall in attempting to introduce some slip until a permanent adhesion is attained show through the decorative face of the wall covering; spacer means are often on the surface or embedded in the PSA so that upon development of slight adhesive contact with the wall, the spacers loose their effectiveness; manufacturing difficulties are encountered in placing the correct thickness or otherwise positioning of spacers or projections over an adhesive coating; and have other shortcomings.

The following references are illustrative of the prior art.

U.S. Pat. No. 3,301,741 Henrickson et al. of Jan. 31, 1967. Discloses a self-adhering wall covering comprising: a substrate such as paper; a pressure sensitive adhesive; and a separation means secured to or a part of the backside of the substrate. The spacer means are of a uniformly pebbly contour of raised adhesive protrusions on the back separated by intervening adhesive planar areas wherein the tips of the protrusions are of a friable non-adhesive material which crumble into particles upon the application of pressure to the substrate. Also, the tips of the adhesive projections can be coated with a non-adhesive coating.

U.S. Pat. No. 3,314,838 to Erwin of Apr. 18, 1967. Discloses PSA mixed with microspheres which on drying on the back of a wall covering leaves a thin film of adhesive over the microspheres. Allegedly, the adhesive does not interfere with repositioning until force is applied to break the spheres and permit more adhesive contact.

U.S. Pat. No. 3,331,729 to Danielson et al. of Jul. 18, 1967. Discloses wall coverings which are allegedly repositionable and slidable due to micro balloons over or imbedded in the PSA.

U.S. Pat. No. 3,554,835 to Morgan of Jan. 12, 1971. Shows an allegedly slidable PSA film. When force is exerted on the face of the film, PSA on its backside extrudes from below dots of release material and adheres to the receptive surface, or the dots may be fractured or sink into the PSA.

U.S. Pat. No. 3,663,269 to Fischer et al of May 16, 1972. Discloses a wall covering having a coating of dry encapsulated adhesive on its back surface which is made tacky by the application of heat and/or pressure.

U.S. Pat. No. 3,857,731 to Merrill et al. of Dec. 31, 1974. Discloses a reusable, rebondable sheet having PSA with microspheres embedded in a binder.

U.S. Pat. No. 4,054,697 to Reed et al. of Oct. 18, 1977. Discloses a wall covering having PSA on its back side. The PSA has a coating of resilient non-adhesive particles thereon or imbedded therein.

U.S. Pat. No. 4,376,151 to Parrotta of Mar. 8, 1983. Discloses business forms having PSA on their back side and superimposed thereover is a layer of microspheres which are displaced by application of pressure.

U.S. Pat. No. 4,556,575 to Ochi of Dec. 3, 1985. Discloses a relocatable, multiple use adhesive sheet wherein the back is entirely covered with PSA in which elastic microspheres are embedded.

U.S. Pat. No. 4,735,837 to Miyasaka et al. of Apr. 5, 1988. Discloses self-adhesive wall covering comprising: a substrate; PSA; and elastic micro-balls embedded in the adhesive.

U.S. Pat. No. 5,080,957 to Leseman et al. of Jan. 14, 1992. Discloses a reinforced tape having ribs on one side thereof wherein a PSA is applied over either the front or back side of the tape.

U.S. Pat. No. 5,108,811 to Shippen of Apr. 28, 1992. Discloses a removable, reusable window insulation comprising a thermal insulating material such as polyethylene foam coated with PSA.

U.S. Pat. No. 5,141,790 to Calhoun et al. of Aug. 25, 1992. Discloses a repositionable PSA sheet wherein the PSA has clumps thereon with non-adherent material distributed on the clumps.

JP 61-115981 to Chugokee of Jun. 3, 1986. Discloses a PSA sheet consisting of a base sheet having hollow protrusions which are filled with PSA.

EPO 0367651 to O/Y KYRO A/B of May 9, 1990. Discloses strippable wallpaper having on its glueable surface, areas of water activated adhesive applied over hydrophobic release agent or areas of such release agent applied over such adhesive for easy release from a wall.

PTC WO 91/09725 of Jul. 11, 1991. Discloses a carpet cushion having PSA coated thereon and a scrim webbing or other spacer element laid on or into the PSA after the adhesive has been applied.

Our invention provides a decorative sheet such as a wall covering that is manufactured with an adhesive on its back or working surface, thus resulting in a so-called self-adhesive or PSA wall covering that may be applied to a support surface and yet repositioned, and which does not require the use of additional cement, glue or wallpaper paste. This invention also provides a decorative sheet which can make adhesive contact on slight initial pressure, yet which can be repositioned before and until a final desired position is achieved.

A substantial area of the decorative sheet working surface is provided with a tacky, pressure sensitive adhesive. However, remaining on the working surface area are spaces which are not covered by adhesive which provide uniformly distributed discontinuities or spaces. Uniformly distributed non-adhesive projections which have a height equal to or greater than the thickness of the adhesive are provided within the discontinuities on the back side and out of contact with the adhesive.

OBJECTS OF THE INVENTION

It is an object of the present invention to provide a repositionable PSA decorative sheet such as a wall covering or the like that avoids the disadvantages and defects of the prior art.

Another object of the present invention is to provide a single layered or laminated self-adhesive decorative sheet such as a wall covering comprising a fabric, plastic film, or paper substrate, possessing a decorative printed or embossed front or decorative side and a back side, a PSA applied over a substantial portion of said back side, and projections applied to said back side, said projections spaced apart from the adhesive and having adhesive adjacent thereto wherein the height (thickness) of the projections is at least equal to the thickness of the adhesive for partially and temporarily maintaining a separation or slight contact between the PSA and a wall or other substrate to be covered, while the projections contact and are moved along the wall or substrate until the sheet is properly positioned whereupon pressure applied on the decorative side will cause the adhesive to be anchored to the wall.

Various other objects, advantages, and features of this invention will be readily apparent from the following detailed description and appended claims.

SUMMARY OF THE INVENTION

In accordance with this invention, a PSA-backed decorative sheet is provided which is decorated on one side and has on the other or back side, PSA for adhesion, and projections which act as spacers between the PSA and the wall to prevent full contact between the wall and the PSA, whereby the wall covering can be initially repositioned by sliding the surface of the projections across the wall surface until a desired location is achieved. Then by applying sufficient pressure to the outer decorated surface the separation created by the projections between the PSA and the wall is overcome and the PSA, not otherwise in contact with the wall, contacts and adheres to the wall. Thus, a wall covering is provided which can slide freely against the surface of the wall and which develops additional tack after pressure is applied. By "wall" herein is meant a wall or partition as in a room or on the inside or outside of a building. However, "wall" shall also mean herein any solid surface which can receive a PSA-backed decorative sheet, including and not by way of limitation, cabinets, doors, floors, ceilings, shelves, signs, fences, billboards, automotive vehicle siding, windows, stationary, drawers, borders, waste baskets, lamps, pictures, movable paneling, etc.

BRIEF DESCRIPTION OF THE DRAWINGS

The following detailed descriptions, are given by way of example and are not intended to limit the present invention which will be better understood in conjunction with the following drawings in which.

DETAILED DESCRIPTION OF THE INVENTION

Figure 1:
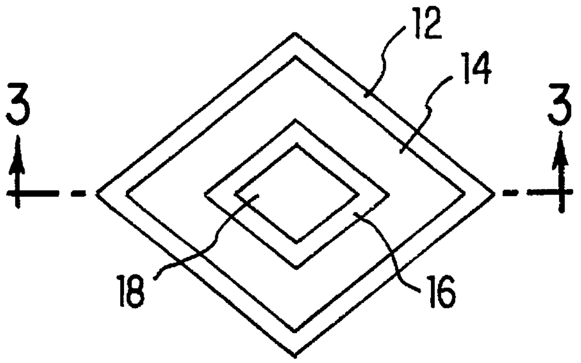
FIG. 1 is a plan view of a preferred embodiment of a single pattern of spaces, adhesive and projections on the back of a decorative sheet of this invention.

Referring now to the drawings, the invention comprises a decorated, printed or embossed decorative sheet 10 having a decorative side 10A such as that of fabric, metal foil, plastic film, such as vinyl, (i.e., polyvinyl chloride), or polyester, cellulosic material, such as but not limited to paper, and combinations thereof, to which has been applied on the back or working side 10B a tacky PSA (pressure sensitive adhesive), in a desired pattern.

Referring now more specifically to FIG. 1, there is shown a design on the back. 10B which has a projection 18, of a diamond shaped cross section, a diamond shaped gap or space 16 surrounding the projection 18, diamond shaped PSA 14, and a diamond shaped space or gap 12 surrounds the PSA. The projection 18 occupies an area of about 0.03296 square inches which is about 9.4% of the design area on back 10B. The gap 16 occupies an area of about 0.01394 square inches on back 10B which is about 4% of the design area. PSA 14 occupies an area of about 0.23317 square inches on back 10B which is about 66.7% of the design area. The outer space or gap 12 occupies an area of about 0.06936 square inches on the back 10B which is about 20% of the design area.

Figure 2:
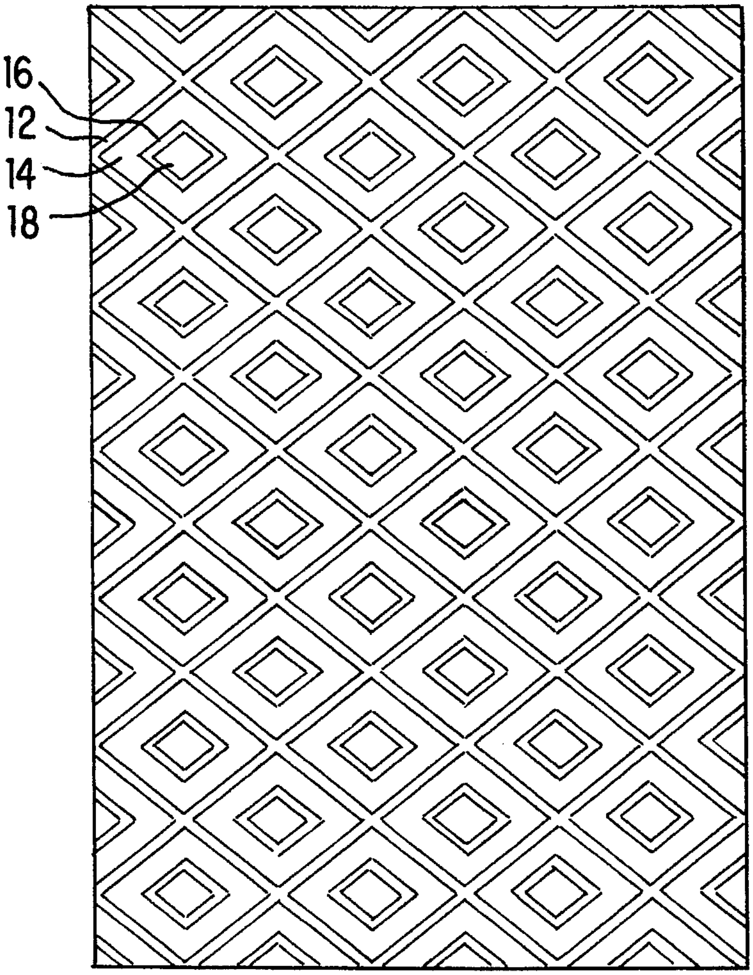
FIG. 2 is a plan view of the back of a decorative sheet of this invention showing a repeating pattern of FIG. 1.

FIG. 2 shows repeating units of the design of FIG. 1 on the back 10B of the rectangular decorative sheet with the acute angles facing the longer dimension of the sheet. Outwardly of adjacent adhesive diamonds 14 the diamond shaped gap is made up of adjacent gaps 12 of FIG. 1 and thus the spacing between adjacent adhesive diamonds 14 is twice as great as that set forth in FIG. 1. The distance between the centers of adjacent projections 18 on a line parallel to the long axis of the back 10, i.e. in the direction of the obtuse angles, is about 0.7 inches; whereas on a line along the short axis of the back 10B, i.e. from the centers of the projections 18 along a straight line between adjacent diamonds having acute angles facing each other the distance is about 1 inch; and finally the distance from the centers of projections 18 in a straight line which is angled from sides of back 10B such as in about a diagonal direction is about 0.6 inches. The back 10B has about 250 projections 18 for each square foot of surface.

Figure 3:
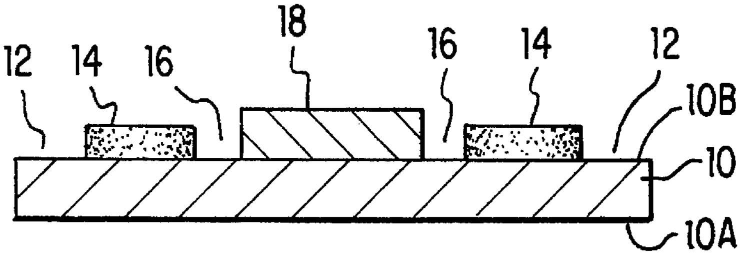
FIG. 3 is a vertical cross section on line 3—3 of FIG. 1.

In the vertical cross section of FIG. 1, as shown in FIG. 3, it can be seen that projection 18 rises from back 10B and extends above the height or thickness of adhesive 14 and that there is neither adhesive nor projections within gaps 12 and 16 on back 10B so that a separation is provided between projections 18 and adhesive 14. The thickness (height) of projections 18 rising above the surface of the adhesive 14 as best shown in FIG. 3 is preferably about 2% to 30% more than the thickness of PSA 14. The thickness of the PSA 14 on surface 10B is about 0.00125 inches, i.e., one and a quarter of a mil.

Figure 4:
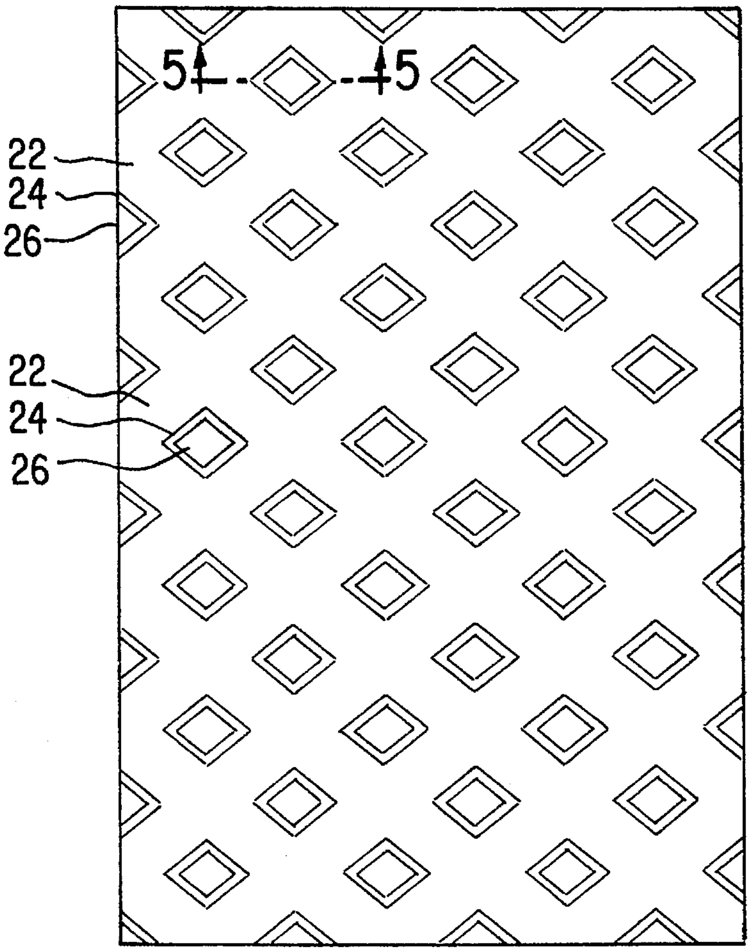
FIG. 4 is a plan view of another repeating pattern on the back of a decorative sheet of this invention.
Figure 5:
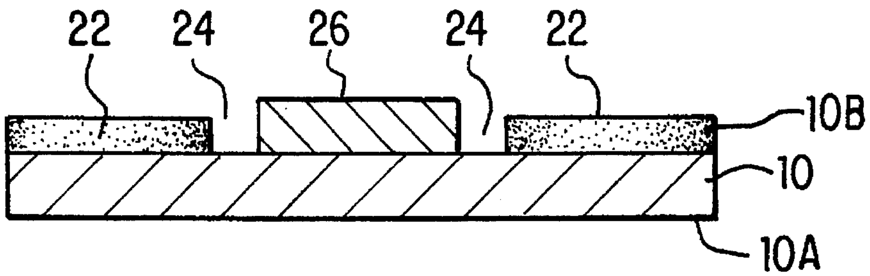
FIG. 5 is a vertical cross section on line 5—5 of FIG. 4.

FIG. 4 and FIG. 5 show another embodiment of the invention wherein the layer of PSA 22 is continuous on the back 10B except for islands of projections 26 surrounded by gaps 24 which in turn are surrounded by PSA 22. In FIGS. 4 and 5, the dimensions of the projections 26 and gaps 24 are the same as projections 18 and gaps 16 in FIG. 1.

Figure 6:
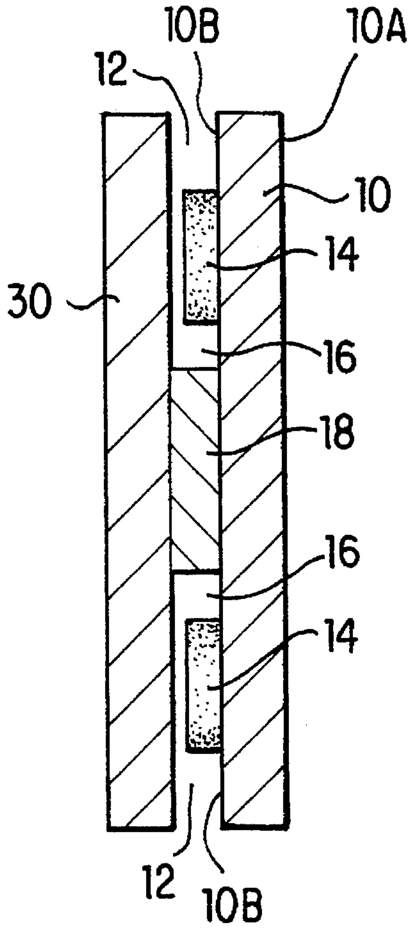
FIG. 6 is a vertical cross section of the pattern of FIG. 1 as initially applied to a wall before contact with the PSA.

FIG. 6 shows a cross section of the pattern of FIG. 1 as it is positioned against a wall 30 with only the surface of the projection 18 facing the wall 30 in contact therewith and the PSA 14 spaced from the wall with gaps 16 between the projection. 18 and the adhesive 14, 14 on either side of the projection as well as spaces or gap 12, 12 outwardly of adhesive 14, 14 wherein the projection 18 and adhesive 14 extend outwardly from the back 10B of sheet 10.

The Material of the Decorative Sheet

The decorative sheet can be, without limitation, any natural or synthetic cloth fabric, plastic, paper, or paper-like material, copolymer, laminate, metallic foil, or the like or combination thereof, which can be manufactured in a layer, sheet, web or film and printed upon, embossed, or otherwise decorated on at least the front surface and which is printable on the back surface. This can include, for example, wall-coverings, billboard advertising, home and commercial decorations, and the like. There is no limitation on the thickness of the decorative sheet. Preferably the decorative sheet is flexible so that it adjusts to the contour of slight projections or dimples on the underlying wall to which it is applied even though at times such underlying surface imperfections may not be visible from the decorative side of the sheet after it is applied to the wall. The sheet material of decorative sheet 10 can be produced by any manufacturing technique known to those skilled in the art, including and not by way of limitation, extruding, co-extruding, molding and blow molding, sheeting, rolling, stamping, calendering laminating, or by the use of paper or foil making machines, and the like.

The decorative sheet is sufficiently colored, patterned, printed or embossed as to be at least opaque and preferably not transmissive so that the projections on the back side are not visible through the face side. Particularly preferred decorative surfaces are manufactured from paper, embossed paper, and vinyl film.

The PSA

The PSA useful in the present invention can be any adhesive known to those in the industry provided it exhibits sufficient initial tackiness to cause the decorative sheet to aggressively adhere to the wall.

Of the preferred elastomeric-type PSA, many chemical compositions are known to those skilled in the art and without limitation these are useful in the present invention. Thus, for example, elastomeric-type PSAs comprising natural rubber, reclaimed rubber, styrene-isoprene-styrene rubber, butadiene-acrylonitrile rubber, polyvinyl ether rubber, styrene-butadiene-styrene rubber, butyl rubber, polyisobutylene rubber, nitrile rubber, styrene-butadiene rubber, polyurethane, polysulfide, polyesters, silicone resins and gums, neoprene rubber, acrylic, methacrylic, polyacrylate ester rubber, and vinyl and mixtures thereof are useful in the present invention.

Room temperature curing PSAs are predominately based on the use of metal chelates or diisocynates to obtain cross-linking.

Particularly preferred herein as PSAs are compositions comprising silicone, including copolymers comprised of vinylidene fluoride and/or tetrafluoroethylene with organopolysiloxane and an organohydrogenpolysiloxane. Silicone PSAs have good thermal resistance, cold resistance, chemical resistance, electrical insulating properties, and controllable tack and hence are used for extensive purposes. Silicone cross-linking agents for optional use herein include organic peroxides and alkoxysilanes.

Preferred organic PSAs herein are the acrylate adhesives, which are normally a copolymer of a higher alkyl acrylate, such as 2-ethyl hexyl acrylate, copolymerized with a small amount of a polar comonomer. Suitable comonomers include acrylic acid, acrylamide, maleic anhydride, diacetone acrylamide, and long chain alkyl acrylamide. Additional preferred organic PSAs include polyvinyl acetate, vinyl acetate copolymer including comonomers of acrylate and maleate or ethylene, and acrylics.

The silicone adhesive and/or organic adhesive composite may be applied to the printed substrate 10 from solution, emulsion or solventless.

Solution application of the PSA composite to the back of the decorative sheet requires only an amount of solvent that is capable of dissolving the adhesive. Such solvents are preferably non-polar and include toluene, dimethyl ether, xylene, etc. Aromatic solvents are preferred. Aqueous emulsions of PSA without organic solvent are even more preferred herein. Typically, a solventless silicone PSA can be prepared with a viscosity of from 100 to 100,000 centipoise at 25° C. An organic solvent is typically used when the polydiorganosiloxane has a viscosity of at least one million centipoise, a so-called silicone gum.

The solvent should not have such a low vapor pressure that it is difficult to remove from the adhesive in a drying process. If the solvent is too difficult to remove then phase separation may occur following precipitation but prior to complete solvent removal.

Adhesive emulsions or solutions for application to the back of the decorative sheet generally contain from about 10 to 400 parts by weight of adhesive solids, i.e. micelles of adhesive or solute, for each 100 parts by weight water or organic solvent. Preferably, the solids should range from about 15 to about 200 parts and more preferably from about 20 to about 100 parts by weight for each 100 parts by weight of water or organic solvent.

Following application and drying of the PSA, the adhesive can be cross-linked as needed. Where an alkoxysilane is utilized as the cross-linking agent, cross-linking will occur by simply exposing the composite to atmospheric moisture. Heating may be used to speed the cure. However, where a peroxide cross-linking agent is utilized, then a heat cure is often necessary. Thus, the composite must be exposed to temperatures ranging from about 80° to about 200° C., for times varying between about 5 minutes to about 1 hour.

Persons skilled in the art are readily familiar with cross-linking these systems.

In a more preferred embodiment, the PSA is high solids, with little or no water or solvent and is applied directly to the back side.

The PSA is generally applied over at least 40% and preferably over at least 50% or 60% of the decorative sheet back side. The adhesive must be applied in a layer thick enough to adhere to both smooth and rough surfaces. The thickness of the adhesive layer on the back is preferably about 0.00125 of an inch, i.e. 1.25 mils, but will generally vary from about one quarter of a mil to 2 mils or more. However, thicknesses of more than 2 mils are generally a waste of adhesive.

The percent of back surface area occupied by the PSA as well as the percent of the back surface area occupied by the projections and the height of the projections rising above the plane of the adhesive surface are selected to allow the back side to be slidably moved on the surface of a wall to reposition the sheet and finally to be firmly attached to the wall by application of pressure on the decorative side of the sheet.

A particularly preferred ratio of area of adhesive covering the back side of the decorative sheet to area of projections is about 6 to 9 times greater for the adhesive for every unit of area covered by the projections. However, such ratio can vary over a wide range such as from about a ratio of 4 times more adhesive area than area of the surface of the projections on the back to about 15 times more adhesive area than the area of the surface of the projections attached to the back side with a preferred range of such areas being in a ratio of about 5:1 to 10:1. More adhesive area generally reduces the slip to much less. Less adhesive area can negatively impact adhesion to the wall.

The total area of the decorative sheet back covered by PSA can vary from about 40% to 90% of the back and preferably from 50% to 85% thereof.

The Projections or Separation Means

The height (thickness) of the projections are sufficient to allow the PSA-backed wall covering to be moved while the projections are in contact with the wall without a significant surface of the PSA contacting the wall. When the desired location for the wall covering is attained, increased pressure on the decorative or front side of the wall covering causes slight deformation of the decorative sheet, compression of the projections, or a combination thereof sufficient to cause a significant area of the PSA to contact the wall surface to thereby firmly anchor the wall covering to the wall permanently.

The size, location, repeating design and surface area of the projections can also be varied to match or register with the printed or embossed patterns on the face of the decorative sheet. In this manner, the deductibility of the projections can be significantly reduced.

The projections on the back of the decorative sheet can be circles, diamonds, squares, ellipses, rectangles or other shapes, including irregular shapes such as wavy lines. Although many patterns were tested, it was found that the pattern of a diamond shaped projection, as shown in the drawings, gives the best positionability and still allows adhesive to be maximized at the edges even when trimming or cutting the decorative sheeting. Illustratively, use of circular patterns are not a preferred embodiment since they materially cut down on surface area for adhesive on the back. Squares or rectangles can be used but there is a risk that the sheet edges will be cut on a line adjacent the squares or rectangles which is devoid of adhesive.

It is desirable to use projections which have a height equal to or slightly more than the thickness of the adhesive to thereby minimize the deformation of the face of the decorative sheet when it is pressed to engage the PSA to the wall. The higher the projections above the adhesive thickness, the more noticeable can be the strike through, i.e., conspicuous visibility of the projections or separation means on the decorative side after final adherence to a wall. However, if the projections are not sufficiently high, insufficient separation is provided to allow the wall covering to slide over the wall on the surface of the projections without the PSA firmly adhering to the wall. Projections having a height greater than about twice the thickness of the adhesive should be avoided since the projections can generally be visible on the face of the wallcovering, i.e., strike through, when it is permanently secured to a wall.

Scrim and long strands generally provide strike through. One reason for this is that the scrim is often too thick and thus shows an imprint and if it is made thinner it is inoperable. The other and main reason is that it follows a continuous line pattern instead of being in the shape of projections having a relatively small cross section and thickness. Normally, the wall has random bumps or dimples on its surface, but the scrim netting or straight strands, are symmetrical and thus show up.

The projections can be individual projections or a clump of closely spaced projections.

The cross section of each projection will generally vary from about 0.01 to about 0.5 square inches, preferably 0.02 to 0.1 square inches, and particularly about 0.02 to 0.06 square inches. The total area of the back of the decorative sheet covered by the projections can vary from about 5% to 20% and preferably from about 7% to 15%.

The projections are preferably spaced so that there are about 200 to 300 projections per square foot of surface area on the back of the decorative sheet. This is equivalent to about 1.5 to about 2 projections per square inch on the back of the decorative sheet.

Anything that can be used as the ink on a printing machine can be used for fabricating the projections so long as it is not sticky or tacky upon drying so that they can slide over the surface of a wall. Thus, any plastic, including resinous material, which can be placed in solution, dispersion or emulsion and which is not sticky or tacky on drying can be used. The projections can be made of organic polymeric material such as polyurethane, polyvinyl chloride, polyethylene, polypropylene or polystyrene and the like. PVC plastisols are a preferred raw material for the projections. Projections of such polymeric material generally possess some resiliency. The solvent or dispersing agent can be any one or a combinations of conventional solvents, e.g. organic solvent or dispersing agents for plastic or resinous material such as mineral spirits, various esters, ketones, etc.

An expandable or foamable product, such as Expancel® from Nobel Industries can be used on the back of the sheet as the projections. Other deformable plastic foams can be selected from the group consisting of urethanes, polyvinylidene chloride, polyethylene, polypropylene, polystyrene, rubber latices (natural and synthetic), and polyvinyl chloride. The decorative sheet of this embodiment will be able to slide along a wall as the foam contacts the wall surface, and without significantly contacting the PSA with the wall and yet can be permanently adhered by the application of sufficient pressure to deform the foam and thereby place the PSA in substantially full contact with the wall.

Spaces Between the PSA and Projections

In positioning the projections and adhesive on the back of the decorative sheet, e.g., by printing, care needs to be exercised to prevent contact of the projections with the adhesive. Projections which are contacted with adhesive will interfere with slidability of the projections on a wall surface. To prevent such contact the adhesive and projections are generally separated by a space on the back surface. In practice such space can vary over a wide range but it is desirable in order to obtain maximum area of adhesive coverage on the back that such space be as little as possible such as that of from about one-sixtyfourth (1/64) of an inch to one sixteenth of an inch although such space can be larger, e.g. one-eighth or one-quarter or more of an inch.

The total area of the back which is not covered by projections or PSA, i.e., the spaces on the back side, can vary over a wide range such as that of about 3% to 30% of the back and preferably from about 4% to 25% of the back.

Placement of the Projections and PSA on the Decorative Sheets

The PSA and projections can be placed on the decorative sheets by various techniques although printing is the preferred method. Generally, the projections are first printed in a pattern onto the back side. In the areas that do not have printed projections, there is printed adhesive while a space is maintained on the back between projection and adhesive. Such printing allows for independent control of the adhesive thickness (laydown) and the thickness or height of the projections, thus allowing for infinite ratios of one height to the other. It also allows unique and accurate control of the pattern or geometry of each. Although many printing processes such as gravure, flexographic, ink jet, or lithographic can be used, screen printing is preferred. Screen printing can be flat screen (silk screen) or rotary screen. The rotary screen process is preferred since it lends itself to long production runs, allows for a controlled pattern or design, is capable or controlling the amounts of inks or adhesive, i.e. thickness or laydown rates, and is capable or in-register or side-by-side pattern printing In practice, it may be necessary to cover the back side of the decorative sheet containing the PSA and the projections with a suitable release paper which, when the sheet material is rolled up for storage purposes, prevents adhesion to the decorative surface of the sheet material. Immediately prior to the sheet material being applied to a-support surface the release paper can be removed, exposing the adhesive and projections. Alternatively, the decorative surface can have a release coating thereon so that the adhesive does not stick to the decorative surface when the sheet is rolled.

To further demonstrate and explain the present invention, and not by way of limitation, the following examples are presented.

EXAMPLE 1

In a preferred mode of placing the PSA and the projections on the back of a paper decorative sheet as shown in FIG. 1 and FIG. 2, the paper is hung on an unwind stand. The paper had a decorative printed pattern on its face side and a silicone release top coat applied over the decorative face side. The paper is then fed onto a creeper table that allows each roll to be spliced without shutting down the line. Next, the paper is conditioned in an oven that removes all excess moisture, and then into a tensioning device that controls the web tension through the printing process. There are two print stations. The first is a rotary screen station in which the projections are printed on to the back of the decorative sheet. A 40 mesh screen that was engraved in a diamond pattern as shown in FIG. 1 was used. Brant 2031 PVC plastisol was used at 4,000 cps. The squeegee was rubber and the oven set at 300° F. Press speed was 31 yards per minute. The plastisol height laid down was 1 mil (+or −0.25 mils) dry. The second station printed the PSA on the back of the decorative sheet. Daubert DC 7009 EM was used. Another preferred pressure sensitive adhesive is 3M 4224-NF. The PSA was at a viscosity of 3,000 cps. A 40 mesh screen was used with a rubber squeegee. The oven was set at 300° F. The adhesive height was approximately the same or slightly lower than the projections. After the adhesive is applied, the printed paper is wound into a master roll for later slitting and trimming to the proper width and length for use as a wall covering. The resulting wallcovering will have excellent slideability, removeability and initial tack with no visual detection of the projections after it is secured to the wall.

EXAMPLE 2

Printed and embossed paper decorative sheet, 70 pounds per ream, measuring 20.5 inches across is printed by gravure with a pattern of squares by a dispersion of polyvinyl acetate. The squares are uniformly positioned over the back side. An acrylic PSA (C800) obtained from Century Adhesive, Columbus, Ohio is then printed by gravure on the back of the decorative sheet so that about 55% of the back surface adjacent the squares but not in contact therewith is covered by the adhesive. The thickness of the adhesive is about 15% less than the thickness or height of the polyvinyl acetate. The total area of the back covered by the projections is about 12%. Area adjacent an edge of the resulting wall covering is lightly brought in contacted with a wall and then slid on the wall surface on the projections for accurate positioning. Then pressure from a person's hand or a roller tool is used to press the PSA into contacting the wall for permanent adhesion.

That which is claimed is:

1. A self-adhesive decorative sheet that is easily repositioned after initial contact with a wall, comprising:

A. a sheet having a decorative front side and a back side;

B. a tacky pressure sensitive adhesive layer applied onto said back side, said layer having gaps lacking adhesive on said back side; and C. projections which are not sticky or tacky rising from said back side within said gaps and having a height at least equal to the thickness of the adhesive, said projections being separated from the adhesive by a portion of said gaps.

2. The sheet of claim 1 fabricated of a material selected from the group consisting of natural or synthetic cloth, metal foil, plastic, and pressed cellulosic material.

3. The sheet of claim 1 wherein the projections are resilient.

4. The sheet of claim 1 wherein the projections and adhesive are printed in a uniform pattern having about 1.5 to 2 projections per square inch and wherein at least 60% of the back side is covered by adhesive.

5. The sheet of claim 2 wherein the material is that of paper.

6. A self-adhesive wall covering that is easily repositionable on a wall by sliding after initial contact with the wall and which can be subsequently firmly adhered to the wall, said covering having a decorative front side and a back side, comprising:

A. a tacky pressure sensitive adhesive on the back side;

B. projections having a height which is at least equal to the thickness of the adhesive in contact with and rising from said back side, said projections being out of contact with the adhesive and wherein the projections enable the back side to slide over a wall by inhibiting contact of the adhesive with said wall while the back side can be firmly adhered to said wall by application of pressure to its front side.

7. A decorative sheet having on its back surface a uniformly distributed printed pattern of non-tacky projections having a tacky pressure sensitive adhesive adjacent each projection; the adhesive and projections being separated from each other in the plane of the back surface and wherein the projections have a height which is at least equal to the thickness of the adhesive.

8. The decorative sheet of claim 7 wherein the projections and adhesive are uniformly distributed in a pattern over the surface of said back, each projection is surrounded by adhesive, and at least 60% of the back is covered by adhesive.

9. The sheet of claim 7 wherein the sheet is rectangular and the projections have a diamond shaped cross section in the plane of the back surface and the diamonds are positioned with the acute angles thereof in the direction of the larger dimension of the sheet.

10. A decorative sheet having a decorative surface and a working surface, wherein said working surface comprises:

A. uniformly distributed printed projections rising above said surface and having a substantially diamond shaped cross section wherein each square foot of working surface contains from about 200 to 300 projections;

B. uniformly distributed adhesive adjacent the projections and spaced therefrom printed on at least 40% of said surface, the thickness of said adhesive being substantially equal to or less than the height of the projections; and C. wherein the combination of projections and adhesive permit the sheet to be slidable over a wall and to be subsequently permanently secured thereto by application of force on the decorative surface.

11. The sheet of claim 10 wherein: adhesive surrounds the projections; the area covered by the adhesive is at least about 60% and the area covered by the projections is from about 5% to 20%.

12. A self adhesive decorative sheet that can be repositioned after initial contact with a wall, said sheet having a decorative front and a back side, said back side having non-adhesive projections and a tacky pressure sensitive adhesive over its surface, wherein:

A. the projections form a uniform pattern and cover about 5% to 20% of the total surface area of the back;

B. the adhesive is in a uniform pattern and covers about 40% to 90% of the total surface area of said back, said adhesive being in side by side relationship with the projections while spaced apart from said projections and having a thickness equal to or less than the thickness of the projections; and C. wherein the projections allow the back to slide on a wall and the sheet to be finally firmly attached to the wall by application of pressure to the decorative side of the sheet.

13. A rectangular sheet of claim 12 wherein the projections have a diamond shaped cross section and the long axis of the diamonds are substantially perpendicular to the long axis of the rectangle.

14. The sheet of claim 12 wherein:

A. the area covered by each of the projections varies from about 0.02 square inches to about 0.1 square inches;

B. the total area covered by the adhesive is at least 50% of the back with the ratio of such area to the total area of the projections over the sheet being from about 3.5:1 to 15:1;

C. the thickness of adhesive is from about a quarter of a mil to 2 mils; and

D. the height of the projections is from about equal to the thickness of the adhesive to about twice such thickness.

15. The sheet of claim 14 wherein:

A. the area occupied by each of the projections over the sheet is from about 0.02 square inches to about 0.07 square inches;

B. the total area of adhesive over the sheet is at least 60% of the back of the sheet and the ratio of the total adhesive area to the total area of the projections over the back is, from about 5:1 to 10:1;

C. the thickness of the adhesive is from about half a mil to about 1.5 mils; and D. the height of the projections is from about at least the thickness of the adhesive to about 60% more than such thickness.

16. A method of manufacturing a decorative sheet having a decorative front side and a glueable back side, comprising the steps of:

A. printing projections on the back side;

B. printing a tacky pressure sensitive adhesive on said back side wherein the adhesive does not overlap with the projections and has a thickness equal to or less than the thickness of the printed projections and wherein the distribution, area occupied by the projections and adhesive, and the thickness of the projections rising above the plane of the adhesive surface allow the back side to slide by contact of the projections along the surface of a wall in order to reposition the sheet and finally be firmly attached to the wall by application of pressure on the decorative from side.

17. The method of claim 16 wherein the sheet is a wall covering selected from the group consisting of natural or synthetic cloth, plastic, metal foil, and pressed cellulosic material.

18. The method of claim 16 wherein: the sheet is rectangular; the projections have a diamond shaped cross section with the long axis of the diamonds substantially perpendicular to the long axis of the sheet; the projections are placed in a uniform pattern on the sheet and cover about 5% to 20% of the total surface area of the back side; the adhesive is placed in a uniform pattern on the sheet, adjacent each projection and covers at least 50% of the back side surface area.

19. The method of claim 16 wherein the decorative sheet is that of paper.

20. The sheet of claim 1 wherein the gaps have a first portion and a second portion, the projections are located on the first portion of the gaps and the second portion of the gaps separating portions of the adhesive from each other.

21. The sheet of claim 1 wherein there is an absence of contact between the projections and the adhesive.

22. The sheet of claim 1 wherein each projection is a single mass.

23. The method of claim 16 wherein the adhesive is printed on the back side such that there are gaps separating portions of the adhesive on the back side from each other.

24. The method of claim 16 wherein the adhesive and projections are printed on the back side to avoid contact between the adhesive and projections.

25. The method of claim 16 wherein each projection is printed to be a single mass.

* * * * *